United States Patent Office 3,429,830
Patented Feb. 25, 1969

3,429,830
PROCESS FOR PREPARING A CRYSTALLINE
ZEOLITE CATALYST COMPOSITE
Malden Ward Michael, Stamford, Conn., assignor to
American Cyanamid Company, Stamford, Conn., a
corporation of Maine
No Drawing. Continuation-in-part of application Ser. No.
396,398, Sept. 14, 1964. This application Apr. 18, 1967,
Ser. No. 631,618
U.S. Cl. 252—453                                    5 Claims
Int. Cl. B01j 11/44, 11/40

ABSTRACT OF THE DISCLOSURE

This invention relates to a process for preparing an intimately associated catalyst composite of improved stability comprising a silica-alumina hydrogel and a crystalline alumino-silicate characterized by the addition of aluminum sulfate to a preformed aqueous mixture of alkali metal silicate and crystalline alkali metal aluminosilicate while maintainign a pH above 7.

---

This application is a continuation-in-part of application Ser. No. 396,398, filed Sept. 14, 1964 and now abandoned.

This invention relates to aluminosilicate-inorganic oxide gel catalyst materials and more particularly to an improved process for preparing such catalyst materials, and in particular such catalyst materials of improved stability.

Crystalline metal aluminosilicates have recently been described as catalyst materials per se, as have composites of such materials with various inorganic oxides. See, for example, U.S. Patents 2,971,903; 2,962,435; 3,140,249 and 3,140,253. With regard to composites of crystalline metal aluminosilicates and inorganic oxides, various methods of synthesizing these materials are disclosed in such patents as U.S. Patents 2,962,435; 3,140,249 and 3,140,253.

In accordance with the teachings of the prior art, and in particular U.S. Patent 3,140,249, an aluminosilicate may be composited with an inorganic oxide gel or hydrogel and thereafter base exchanged or, if desired, base exchanged subsequent to activation as by drying. In general terms, it may be said that the aforesaid patent discloses such a procedure for use in combination or connection with composites of inorganic oxides, as for example silica-alumina gel composites. In general, such procedures may be said to produce catalyst materials useful in the field of the catalytic cracking of petroleum hydrocarbons, in which the catalyst has, for example, good selectivity and good stability.

While in general terms we have found that such catalyst composites were characterized by a measure of stability, and in particular steam stability, i.e., the ability not to become deactivated at an excessively high rate in the presence of steam, there is always room for substantial improvement in the steam stability of cracking catalyst, since such catalysts are repeatedly subjected to regeneration due to coke formation during use.

In this regard, as is known, in the regeneration of cracking catalyst to remove coke, the catalyst is first subjected to a steam treatment to strip out entrained oil and then subsequently the carbonaceous deposits or coke are burned off by contacting them with an oxygen-containing gas at elevated temperature.

While it might be suspected that in the formation of catalyst composites of the type contemplated by this invention that the crystalline aluminosilicate may be present during the formation of the silica-alumina hydrogel components of the final composite, there is no suggestion of such a procedure in the prior art relating to the preparation of such composites. However, even in this specific area of manufacture I have determined that certain critical steps are essential in order to produce a truly steam-stable catalyst composite characterized by a high order of activity and selectivity.

Accordingly, it is an object of the present invention to provide a process for preparing crystalline metal aluminosilicate-inorganic oxide gel catalyst composites which are characterized by excellent activity, selectivity, and improved stability to steaming.

It is a further object to provide a simple and inexpensive method for preparing catalyst composites of crystalline aluminosilicates and inorganic oxides, which process is readily adaptable to conventional processing equipment and is a simple and straightforward procedure.

These and other objects and advantages of the present invention will become more apparent from the detailed description thereof set forth hereinbelow.

In accordance with the present invention, a process is provided for preparing a catalyst comprising mixing a finely divided crystalline alkali metal aluminosilicate with an alkali metal silicate, adding continuously to said aluminosilicate-alkali metal silicate mixture, aluminum sulfate in an amount to precipitate an intimately associated composite comprising a silica-alumina hydrogelcogel and an alkali metal aluminosilicate while maintaining the pH of the system above 7. Thereafter, the alkali metal aluminosilicate component of the alkali metal aluminosilicate-silica-alumina hydrogel cogel composite is base exchanged with the cation of a metal selected from Group I–B through Group VIII of the Periodic Table. It should be noted that the base exchanging may be carried out either before or after activation of the composite to a catalyst by the application of heat. The base exchanging to remove the alkali metal is carried out until over 90% of such material is removed and the final catalyst material does not contain more than 1% of such metals.

The crystalline alkali metal aluminosilicates contemplated for use in accordance with this invention are characterized by having a structure of rigid three-dimensional networks and uniform pores, are sometimes described as synthetic zeolites, and may be prepared in accordance with U.S. Patent Nos. 2,882,243 and 2,882,244. These materials are essentially the dehydrated forms of crystalline hydrous siliceous zeolites containing varying quantities of alkali metal and aluminum, with or without other metals. The alkali metal atoms, silicon, aluminum and oxygen in these zeolites are arranged in the form of an aluminosilicate salt in a definite and consistent crystalline pattern. The structures normally contain a number of small cavities and are connected by a number of still smaller holes or channels. These cavities and channels are uniform in size and characterized by an effective pore diameter of from between 6 and 15 angstroms.

The metal aluminosilicates should be characterized by fine particle sizes, usually having a mean weight particle diameter of less than 10 and preferably within the range of 2 to 7 microns. In this fine particle size range they are in a sufficient state of fine division as to be readily capable of intimate association with the silica-alumina hydrogel-cogel of this invention.

Commercially, these synthetic zeolites are available from the Union Carbide Company and are sometimes described as "molecular sieves." The crystalline metal aluminosilicates that are intimately associated and are capable of being essentially completely base exchanged are those having a cation with a single valence such as hydrogen, ammonium, and the alkali metals such as sodium, potassium and lithium. Thus, in the present specification, alkali metal is intended to include aluminosilicates having hydrogen, ammonium or an alkali metal as the monovalent cation.

The particular preferred crystalline alkali metal aluminosilicates contemplated by this invention are those described in U.S. Patent Nos. 2,882,244 and 3,130,007, which are directed to those sieves sometimes identified by the Union Carbide Company as Zeolite X and Zeolite Y.

The alkali metal silicate, which is initially mixed with the crystalline alkali metal aluminosilicate prior to the addition thereto of aluminum sulfate, may be any of the available sources useful in the production of silica hydrogels and gels, though most usually is sodium or potassium silicate with the sodium silicate being preferred.

The aluminum sulfate, which is added to the crystalline alkali metal aluminosilicate and alkali metal silicate mixture, is preferably one of the commercially available alums, that is, those containing aluminum sulfate and from 14 to 18 moles of water of hydration. During the addition of the alum to the alkali metal silicate-alkali metal aluminosilicate combination, the pH of the mixture is maintained above 7, and in this manner the maximum amount of alumina is derived from the alum solution to form the silica-alumina hydrogel-cogel in intimate association with the crystalline alkali metal aluminosilicate. As noted, the entire aluminum sulfate addition is carried out on the alkaline side or at a pH above 7 and preferably until a pH of from 8 to about 9 is achieved. In accordance with applicant's procedure, silica-alumina hydrogel-cogel composites may be prepared containing from between about 5 and 40% of alumina and more preferably between about 8 and 15% of alumina, based on the dry weight of the silica-alumina hydrogel-cogel portion of the total composite.

After the addition of the alum and the precipitation of silica-alumina hydrogel-cogel, the resulting composite, in which the crystalline alkali metal alumino-silicate is in intimate association with the silica-alumina hydrogel-cogel, is preferably filtered and washed to remove undesirable anions and salts. Thereafter, if desired, the filter cake material may be base exchanged, ie.., the alkali metal aluminosilicate portion thereof is exchanged out with a cation of a metal selected from Group I-B through Group VIII of the Periodic Table until substantially all of the monovalent alkali metal cation is removed therefrom and polyvalent metals of Group I-B through Group VIII are substituted into the aluminosilicate molecule.

A wide variety of metallic compounds can be employed as a source of metallic cation and include both inorganic and organic salts of metals of Group I-B through Group VIII of the Periodic Table. Representative of salts which can be employed include chlorides, bromides, iodides, carbonates, bicarbonates, sulfates, acetates, citrates, fluorides and the like. The metal salts may be employed singly or in combination with one another and they must be appreciably soluble in the fluid medium in which they are employed.

Preferably, the polyvalent metal employed to exchange out the monovalent alkali metal cation is a rare earth metal such as cerium or lanthanum or mixtures of rare earth metals, alkaline earth metal usually employed as a salt or oxide, as for example, calcium, barium, strontium, and the like, with calcium being greatly preferred, particularly as a halide such as calcium chloride or its oxide in view of their ready availability.

Alternatively, the silica-alumina hydrogen-cogel alkali metal aluminosilicate composite may, after filtration, be dried, as for example tray dried or spray dried, and thereafter the alkali metal aluminosilicate is base exchanged with a metal selected from Group I-B through Group VIII of the Periodic Table as discussed above.

The drying referred to above may be carried out at temperatures of from about 400 to 1500° F., depending upon the composition of the composite, to impart activity to the catalyst composition. Normally, drying is carried out at a temperature of from 700–1200° F.

The precipitating of the silica-alumina hydrogel-cogel in the presence of the crystalline alkali metal aluminosilicate produces an intimately associated composite, although additional steps may be employed to insure intimate association, as for example ball-milling or homogenizing the cogel aluminosilicate composite by subjecting it to high shear by passage of the mixture through a narrow orifice under high pressure.

The crystalline metal aluminosilicate may be incorporated into the catalyst composites of this invention in amounts of from between 5 and about 90% based on the weight of the catalyst, though preferably are present in amounts of between about 5 and 25% thereof. Uniformly good cracking catalysts have been prepared containing amounts of from between 7 and 15%.

The catalysts of this invention may be employed in the form of spheres, microspheres, pellets, extrudates, broken pieces, or in any other conventional catalyst forms such as are described and referred to in U.S. Patent No. 3,140,249, above referred to.

The preferred form is the microspheroidal form in which the intimately associated inorganic oxide hydrogel and the metal aluminosilicate are spray dried. Spray drying in accordance with the present invention is accomplished by spraying the intimately associated composite through a nozzle or from a spray wheel in contact with hot gases. Such drying may be accomplished by any suitable spray drier. One that has been employed with success is described in U.S. Patent No. 2,644,516, dated July 7, 1953. Although gas inlet temperatures of up to 1300° F. may be employed, the temperature of the drying gas entering the spray drying chamber is preferably controlled within the range of about 400 to 1000° F. so that the intimately associated mixture will be converted into a set, partially dehydrated microspheroidal gel particle. Spray drying normally results in a moisture content of from between about 7 and 15% of the spray dried product.

The catalysts of this invention are useful in the catalytic conversion of high-boiling hydrocarbons to lower boiling hydrocarbons, and this is done principally by cracking; but this reaction is accomplished by a number of complex side reactions, including aromatization, polymerization, alkylation, and the like. In the cracking of high-boiling hydrocarbons, the catalyst has demonstrated excellent selectivity, providing enhanced yields of gasoline while maintaining undesirable end products, such as coke, at a minimum. In addition, and a feature to which the catalyst of this invention is directed particularly, catalysts having good stability to steaming and carbon burning are prepared. As a fluid bed cracking catalyst in the conversion of hydrocarbons, the catalyst particles produced in accordance with this invention are in a state of suspension in a vaporous stream of hydrocarbon, and the cracking is effected or carried out at temperatures in the range of between 700 and 1100° F., preferably between 900 and 1000° F.

While I do not know why it is necessary to add the aluminum sulfate to a preformed aqueous mixture of alkali metal silicate and alkali metal aluminosilicate while maintaining the pH above 7, to achieve the catalyst of improved stability of this invention, I believe it is because catalysts so prepared are characterized by their own spectrum of physical properties such as surface area, pore value, pore diameter and the like. It will be appreciated that in carrying out the present process, the pH of the aqueous preformed reaction mixture will be strongly alkaline. As the aluminum sulfate is continuously added, the pH gradually declines, as the silica-alumina cogel is formed. Thus, it is that the cogel is precipitated in intimate association with the synthetic zeolite over a wide alkaline pH range. In seemingly equivalent procedures, it is not true. Thus, where the aluminum sulfate, zeolite, and alkali metal silicate are simultaneously mixed, the cogel is precipitated rapidly and over a narrow pH range. See examples and the comparative table infra.

In order to illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

Example 1

51 parts of a crystalline sodium aluminosilicate identified as Zeolite 13X powder having a mean weight particle diameter within the range of from 2 to 7 microns and the cavities and channels of which are uniform in size and characterized by an effective pore diameter of from between 6 and 13 angstroms, was added to 1500 parts of water and thoroughly mixed. To this was added 1400 parts of N Brand sodium silicate and the mixture again thoroughly mixed. This composition or mixture was termed "Solution A."

Solution B was prepared by dissolving 285 parts of aluminum sulfate in 1400 parts of water.

Solutions A and B were added simultaneously to a butt or heel of 5500 grams of water in a stirred receptacle, maintaining the pH of the solution between 8.7 and 9.2 and the temperature of the mix at 25° C.

The addition was completed in 20 minutes and the final pH adjusted to 9. The resulting mix was dewatered by vacuum filtration and the sodium removed by ion exchange with calcium chloride.

In the removal of sodium by ion exchange, the filter cake resulting from the vacuum filtration was reslurried in 10 pounds of a 2% calcium chloride solution and allowed to stand for an additional 2 hours.

This slurry was filtered and the cake reslurried in 10 pounds of calcium chloride solution and this time permitted to stand overnight. This slurry was again filtered and reslurried in 10 pounds of a 2% calcium chloride solution and permitted to stand for an additional 2 hours on two successive occasions. It was then filtered, reslurried and allowed to stand in 10 pounds of a 2% calcium chloride solution overnight, after which it was again filtered, reslurried and permitted to stand in 10 pounds of a 2% calcium chloride solution for an additional 2 hours, after which it was filtered and the filter cake washed free of chlorides.

The washed cake was then dried overnight at 250° F., ground to pass a 40 mesh screen, and calcined for one hour at 1100° F.

The final catalyst was found by X-ray diffraction to contain 10% of the calcium base exchanged aluminosilicate.

Example 2

Example 1 was repeated in every detail, but the sodium aluminosilicate (Zeolite 13X) was employed in the form of a wet cake having 50% solids instead of the dry powder employed in Example 1.

The final catalyst was found by X-ray diffraction to contain 10% of the calcium exchanged aluminosilicate.

Example 3

Example 3 was substantially identical to Example 2, except that the pH during the admixture of what are identified in Example 1 as Solutions A and B was maintained at 7 and the temperature at 75° C.

The procedures of Examples 1–3 are typical of procedures apparent in the prior art, while Examples 4–6 hereinafter demonstrate the merit of the present invention, wherein the aluminum sulfate solution, or Solution B, is added to a previously formed Solution A of an alkali metal silicate and an alkali metal aluminosilicate.

Example 4

51 parts of a sodium aluminosilicate dry powder (synthetic zeolite described in Examples 1–3) having a mean weight particle diameter within the range of 2 to 7 microns, the cavities and channels of which are uniform in size and are characterized by an effective pore diameter of from between 6 and 15 angstroms, was mixed in 1500 parts of water and 1400 parts of N Brand sodium silicate added thereto with thorough mixing. This mixture was in turn added to 6450 parts of water in a kettle equipped with an agitator.

To this composition was added 285 parts of aluminum sulfate dissolved in 1900 parts of water over a period of 30 minutes while maintaining the temperature at 40° C. The slurry thickened into a gel at about pH 10. The pH at the end of the aluminum sulfate addition was 9.2 and it was adjusted to 9 with sulfuric acid.

The mix was filtered and the sodium removed by ion exchange with calcium chloride employing the process outlined in detail above with respect to Example 1.

The final catalyst was found by X-ray diffraction to contain 10% of the calcium exchanged aluminosilicate.

Example 5

The procedure of Example 4 was repeated in detail, except that 102 parts of the sodium aluminosilicate sieve identified in Examples 1–4 above was employed as a wet cake containing 50% solids instead of the powdered sieve of Example 4.

The final catalyst was found by X-ray diffraction to contain 10% of the calcium exchanged aluminosilicate.

Example 6

Example 6 was carried out in substantially the same manner as Example 5, except the temperature was maintained at 20° C. during the aluminum sulfate addition.

The preparation and catalyst described in Examples 1–6 above were tested for surface area stability after steaming for 17 hours at 750° C. and one atmosphere steam as described in the "Test Methods On Synthetic Fluid Cracking Catalyst" issued by the Refinery Chemicals Department, American Cyanamid Company. Activity after steaming was determined by a modified version of the AGC test also described in the Test Methods cited above. This modification consists in passing 30 ml. of Mid-Continent gas oil over the catalyst in 15 minutes instead of the 70 ml. in one hour as described. BET surface area before and after steaming at 750° C., percent loss of surface area, and weight percent conversions are shown below. Weight percent conversion is determined after distillation of the cracked oil product at 400° F. by the following formula:

$$\text{Wt. percent conversion} = \frac{\text{grams gas oil fed} - \text{grams residue boiling above } 400°F. \times 100}{\text{grams gas oil feed}}$$

TABLE

| | BET surface area | | Percent surface area lost | Wt. percent conv. after steaming 750° C. |
|---|---|---|---|---|
| | M.²/gram before steam | After steam | | |
| Example 1 | 423 | 109 | 74 | 33 |
| Example 2 | 466 | 105 | 77 | 35 |
| Example 3 | 461 | 88 | 81 | 32 |
| Example 4 | 386 | 121 | 68 | 44 |
| Example 5 | 385 | 124 | 68 | 45 |
| Example 6 | 366 | 112 | 69 | 50 |

The results in the table above demonstrate that the catalysts of this invention are more resistant to steaming at 750° C., for they lost only 68–69% of their surface area, as compared to the 74–81% of other catalysts prepared by seemingly equivalent processes. In addition, the catalysts of this invention are more active, giving 40 to 45% conversions after such treatment, as compared to only 32–35% for the catalysts of Examples 1–3.

As will be appreciated, the life of the catalyst depends upon its ability to maintain reasonable surface area over long periods of time. If the surface area drops off too rapidly during conditions of use, the catalyst will have to be replaced sooner than if it drops off more slowly. In commercial use, catalysts meet steam during steam purge to remove entrained oils on leaving the reactor and prior to entering a regenerator where the carbon is burned off. The 17 hour steam at 750° C. and one atmosphere is considered to be an accelerated aging test which gives an indication of how the catalyst will act under use. Since these catalysts retain a greater amount of their surface area and have greater activity after this test, it is safe to conclude that they are more stable and will have to be replaced less frequently in commercial use.

It will be apparent that other promoters may be employed in the catalyst composites of this invention, as for example minor amounts of rare earth elements such as cerium, metals such as ungsten, palladium, platinum and the like may be employed to achieve special effects.

What is claimed is:

1. A process for preparing a catalyst containing synthetic silica-alumina and crystalline aluminosilicate, comprising forming an aqueous mixture of a finely divided crystalline alkali metal aluminosilicate with an alkali metal silicate, adding slowly and continuously to said aluminosilicate-alkali metal silicate mixture, aluminum sulfate to gradually reduce the initial pH of the mixture and continuously precipitate silica-alumina hydrogel in intimate association with an alkali metal aluminosilicate, said hydrogel being formed in contact with the remaining unreacted alkali metal silicate, base exchanging said alkali metal aluminosilicate with a metal selected from the Group I–B through Group VIII of the Periodic Table, and activating the catalyst material by the application of heat.

2. A process according to claim 1, in which the intimately associated composite is activited by heat prior to base exchanging said alkali metal aluminosilicate.

3. A process according to claim 1, in which the intimately associated alkali metal aluminosilicate is based exchanged prior to activating the composite by heat.

4. A process for preparing a microspheroidal cracking catalyst according to the process of claim 1, in which the intimately associated alkali metal aluminosilicate is based exchanged with the cation of a metal selected from the Group I–B through Group VIII of the Periodic Table, the resulting composite washed to remove undesirable anions and then spray dried to form catalytically active microspheroidal particles.

5. A process according to claim 4, in which the crystalline alkali metal aluminosilicate is a sodium aluminosilicate, the alkali metal silicate is sodium silicate, the base exchange is carried out with calcium chloride and the final catalyst contains from about 5 to 25% of the aluminosilicate and from 8 to 15% of alumina based on the silica-alumina cogel portion of the total catalyst composition.

References Cited

UNITED STATES PATENTS

| | | | |
|---|---|---|---|
| 2,962,435 | 11/1960 | Fleck et al. | 252—455 X |
| 2,971,903 | 2/1961 | Kimberlin et al. | 208—120 X |
| 3,140,249 | 7/1964 | Plank et al. | 252—455 X |
| 3,296,151 | 1/1967 | Heinze et al. | 252—455 X |

DANIEL E. WYMAN, *Primary Examiner.*

CARL F. DEES, *Assistant Examiner.*

U.S. Cl. X.R.

252—455